US009710499B2

(12) United States Patent
Duputz et al.

(10) Patent No.: US 9,710,499 B2
(45) Date of Patent: Jul. 18, 2017

(54) METHOD FOR DETECTING THE PLAYBACK OF A DATA PACKET (71) Applicant: THALES, Neuilly sur Seine (FR)

(72) Inventors: Patrick Duputz, Gennevilliers (FR);
Sepideh Fouladgar, Gennevilliers (FR);
Carlos Pinto, Cholet (FR)

(73) Assignee: THALES, Neuilly sur Seine (FR)

( * ) Notice: Subject to any disclaimer, the term of this patent is extended or adjusted under 35 U.S.C. 154(b) by 308 days.

(21) Appl. No.: 14/549,036

(22) Filed: Nov. 20, 2014

(65) Prior Publication Data
US 2015/0142759 A1 May 21, 2015

(30) Foreign Application Priority Data
Nov. 20, 2013 (FR) ..................................... 13 02679

(51) Int. Cl.
G06F 17/00 (2006.01)
G06F 17/30 (2006.01)
H04L 29/06 (2006.01)

(52) U.S. Cl.
CPC .. *G06F 17/30303* (2013.01); *G06F 17/30371* (2013.01); *H04L 63/12* (2013.01); *H04L 63/14* (2013.01)

(58) Field of Classification Search
CPC ............... G06F 17/30; G06F 17/30303; G06F 17/30371
USPC ................................................. 707/600–899
See application file for complete search history.

(56) References Cited

U.S. PATENT DOCUMENTS

2002/0122410 A1* 9/2002 Kulikov ................ H04L 45/302
370/349
2009/0158417 A1 6/2009 Khanna et al.
2011/0153862 A1 6/2011 Roosta et al.

OTHER PUBLICATIONS

Raymond, D. R. et al., "Scalable, Cluster-based Anti-replay Protection for Wireless Sensor Networks," Proceedings of the 2007 IEEE, Workshop on Information Assurance, New York, US (Jun. 20-22, 2007).
Search report dated Sep. 22, 2014 for French Patent Application No. 1302679 filed on Nov. 20, 2013.

* cited by examiner

*Primary Examiner* — Isaac M Woo
(74) *Attorney, Agent, or Firm* — Knobbe, Martens, Olson & Bear, LLP (57) ABSTRACT A method of detecting whether a packet from a plurality of packets transmitted by at least one transmitting station over a network has been played back is disclosed. Each packet includes a message and an identifier, the packets being successively transmitted over several consecutive time periods. The method includes receiving the packet by at least one receiving station and reading of the identifier of the received packet to obtain a received identifier, and consulting, by the receiving station, a database of identifiers already received to determine whether the received identifier has already been received. If the received identifier has not already been received, the method also includes updating the database to include the received identifier. The identifier includes an indicator of belonging to groups of packets.

13 Claims, 3 Drawing Sheets

METHOD FOR DETECTING THE PLAYBACK OF A DATA PACKET

BACKGROUND

Field

The described technology relates to a method of the type for detecting whether a packet from a plurality of packets transmitted by at least one transmitting station over a network has been played back, each packet comprising a message and a packet identifier, the plurality of packets being successively transmitted over several consecutive time periods, the method including the following steps:
- reception of the packet by at least one receiving station and reading of the identifier of the received packet to obtain a received identifier,
- consultation, by the receiving station, of a database of identifiers already received to determine whether the received identifier has already been received, and
- if the received identifier has not already been received, updating the database to include the received identifier.

The described technology relates to the field of network security. Certain embodiments aim to protect against the playback of data packets conveyed in particular via a delay tolerant network (DTN). "Playback" refers to the fact that a data packet has been played back, i.e., transmitted by an unauthorized entity.

Description of the Related Art

The conveyance of data packets through a DTN sometimes creates a significant disruption of packet sequencing. As a result, upon receipt, the detection of playback of a packet is made more complex. In fact, the trace of all of the packets received over a very long time period is kept. This creates significant processing power and memory capacity needs.

Most of the solutions proposed in the related art are based on implementing a transmission counter, which makes it possible to identify the transmitted packets uniquely, and a sliding anti-playback table, with a fixed size, making it possible to keep the trace of the last N packets received, N typically going from 32 to 256.

In these solutions, the receiving station saves the value of the largest of the received packet identifiers, called T, and accepts a new received packet if:
- the identifier is greater than T, or
- the identifier is comprised in the interval [T−N+1;T] if the packet has not already been received.

The receiver rejects packets for which:
- the identifier is less than or equal to T−N+1, or
- the identifier is comprised in the interval [T−N+1; T] if the packet has already been received.

One solution to prevent playback is defined in the context of internet protocol security (IPSec) (RFC 4301). More specifically, both of the following protocols deal with this topic:
- protocol n 51, AH, defined by the RFC 4302, and
- protocol n 50, ESP, defined by the RFC 4303.

In one of the proposed solutions, the anti-playback table stores the identifiers of the received packets or packets not received, the successive identifiers being able to be stored in the form of intervals in order to minimize the size of the sub-table.

Other solutions seek to limit the impact of the reception of an identifier greater than T+N, as this causes part of the stored anti-playback table to be lost. This scenario for example arises when several packets are sent over a route, then a shorter route becomes available, causing packets transmitted later to be received before packets transmitted earlier.

Thus, in one of the proposed solutions, two anti-playback tables are considered, a head table and a tail table. These tables are spaced apart by an interval storing non-received identifiers. If the receiving station receives a packet having an identifier included in that interval, this means that the packet was not received and it is sent to the recipient of the packet. The tail table is offset such that the value of the received identifier corresponds to the upper limit of the tail table.

If the receiver receives a packet with an identifier greater than T but less than T+N, the head table is offset such that the received value corresponds to the upper limit of the head table. The tail table may optionally be offset such that the memory space between the two tables is representative only of the non-received identifiers.

If the receiver receives a packet having an identifier greater than T+N, the tail table spans the head table and becomes the new head table. The received identifier then corresponds to the upper limit of the new head table.

Lastly, to the same end, in one of the proposed solutions, when the receiver receives a packet with an identifier greater than T+N, the receiving station estimates the number of valid packets that may potentially be lost if the table is offset. If that number is above a certain threshold, the received packet is rejected.

The solutions proposed in the related art only work well in situations with a very limited disruption of the sequencing of data packets through the transport network.

In light of the properties of a DTN in terms of throughput of network connections, typically from 100 kbits/s to several Mbits/s, and the storage capacity of the relays of the network, typically from one minute to several hours of network traffic, the existing solutions implement anti-playback tables able to store a very large number of packet identifiers, for example approximately one million. This makes both the manipulation and storage of the table problematic, and results in:
- a latency caused by the anti-playback protection mechanism that may significantly affect the performance of the security equipment,
- a risk of false detection of the playback of a packet, and
- a risk of packet playback not being detected.

One aim of certain embodiments is therefore to provide a method for detecting playback that resolves or minimizes the aforementioned problems.

SUMMARY OF CERTAIN INVENTIVE ASPECTS

To that end, one inventive aspect relates to a method of the type described above, wherein the identifier includes an indicator of belonging to groups of packets,
- the database includes one or more sub-tables suitable for storing the identifiers of packets already having been received, each sub-table respectively being dedicated to one of the groups, and
- the method further includes a step for managing the database including conditional erasure of any one of the sub-tables if all of the packets of the group to which that sub-table is dedicated have been received.

According to specific embodiments, the method includes one or more of the following features, considered alone or according to any technically possible combination(s):

the belonging indicator includes a counting indicator representative of a transmission order of said packet, the sub-table(s) is or are suitable for storing counting indicators respectively belonging to one or more successive intervals of counting indicators, each sub-table respectively being dedicated to one of said successive ranges, and the step for managing the database includes conditional erasure of any one of the sub-tables if the sub-table is full;

the belonging indicator further includes a time indicator representative of the time period during which the packet was transmitted, the counting indicator being representative of a transmission order of said packet within the time period during which the packet was transmitted, the database includes one or more tables, each table respectively being suitable for storing identifiers of packets transmitted during one of the time periods, each table respectively being dedicated to one of the time periods, and each table includes one or more sub-tables;

the step for managing the database includes conditional erasure of any one of the tables if all of the packets transmitted during the time period of that table have been received;

the step for managing the database includes conditional erasure of any one of the tables if the time elapsed between the time period specific to that table and a current time indicator is above a given value;

the database includes a maximum time indicator representative of the maximum of the time indicators of the packets already received, and each table includes a maximum counting indicator representative of the highest counting indicator interval of all of the identifiers already having been stored in said table, and, in the consultation step, the packet is considered already to have been received if the time indicator is below or equal to the maximum time indicator and if:

in the database, no specific table exists for the time period of which the time indicator is representative, or in the database, a specific table for the time period of which the time identifier is representative exists, and in said table, there is a sub-table that has already stored the counting indicator, or in the database, there is a specific table for the time period of which the time indicator is representative, and in said table, there is no sub-table containing the counting indicator, and the counting indicator is less than or equal to the maximum counting indicator of said table;

the method further includes a step for verifying the integrity of at least the received identifier, and generating an alarm if the received identifier does not demonstrate integrity;

each packet includes a security parameter representative of a secret key shared between the transmitter and the receiving station, the secret key being used in the step for verifying integrity;

the receiving station is suitable for receiving packets coming from several transmitting stations and consulting several databases of previously received identifiers, the received identifier including an indicator representative of the transmitting station that transmitted the received packet, the database consulted in the consultation step being chosen based on the indicator of the received identifier;

in the database, for each table, the sub-tables of the table are concatenated and compressed in a single data block; and the receiving station implements:

a Flash memory in which the database is archived completely, preferably in a compressed state, a volatile random access memory comprising at least a partial copy of the database, and a non-volatile memory, preferably in the form of a non-volatile random-access memory (NVRAM), comprising parts of the database updated during the update step and not yet archived in the Flash memory.

Another aspect relates to a computer program, to be installed in a receiving station, said program comprising instructions for implementing a method as defined above when the instructions are executed by the receiving station.

Yet another aspect relates to a receiving station suitable for implementing the steps of a method as described above.

BRIEF DESCRIPTION OF THE DRAWINGS

The described technology will be better understood upon reading the following description, provided solely as an example and done in reference to the appended drawings, in which.

DETAILED DESCRIPTION OF CERTAIN INVENTIVE ASPECTS

In reference to FIG. 1, an installation 1 according to certain embodiments is described implementing a method that will be described below.

The installation 1 includes a transmitting station E suitable for transmitting a message, via a network 3, and a receiving station R suitable for receiving the message M having passed through the network 3 in the form of a packet.

According to alternatives of the installation 1 that are not shown, the installation includes one or more other transmitting stations similar to the transiting station E and/or one or more other receiving stations similar to the receiving station R.

The network 3 is for example a delay tolerant network (DTN) network implementing an IP protocol. Alternatively, the network 3 implements other communication protocols, for example open systems interconnection (OSI) level 2 communication protocols, such as Ethernet, or higher levels.

The transmitting station E is for example a network encryptor (a device making it possible to encrypt and decrypt a packet), a secured tactical radio set, or a secured mobile terminal.

According to one alternative, the transmitting station E also receives, i.e., it has all of the structural and functional characteristics of the receiving station R.

Figure 2:
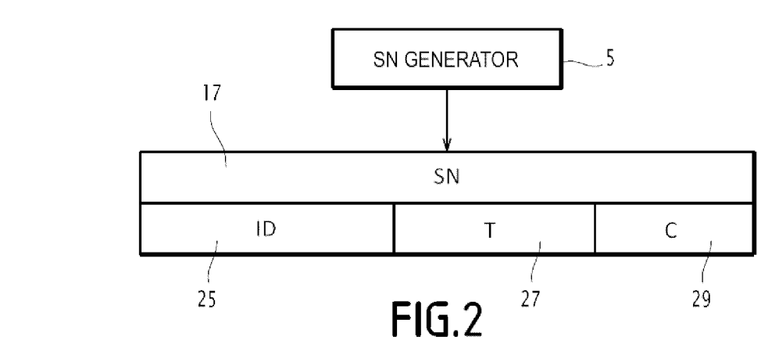
FIG. 2 is a diagrammatic view of a module of the transmitting station shown in FIG. 1.

The transmitting station E includes a module 5 for generating sequence numbers shown in FIG. 2.

The receiving station R is for example a network encryptor, a secured tactical radio set, or a secured mobile terminal.

Likewise, in one alternative, the receiving station R is also a transmitter, i.e., it has all of the structural and functional characteristics of the transmitting station E.

Figure 3:
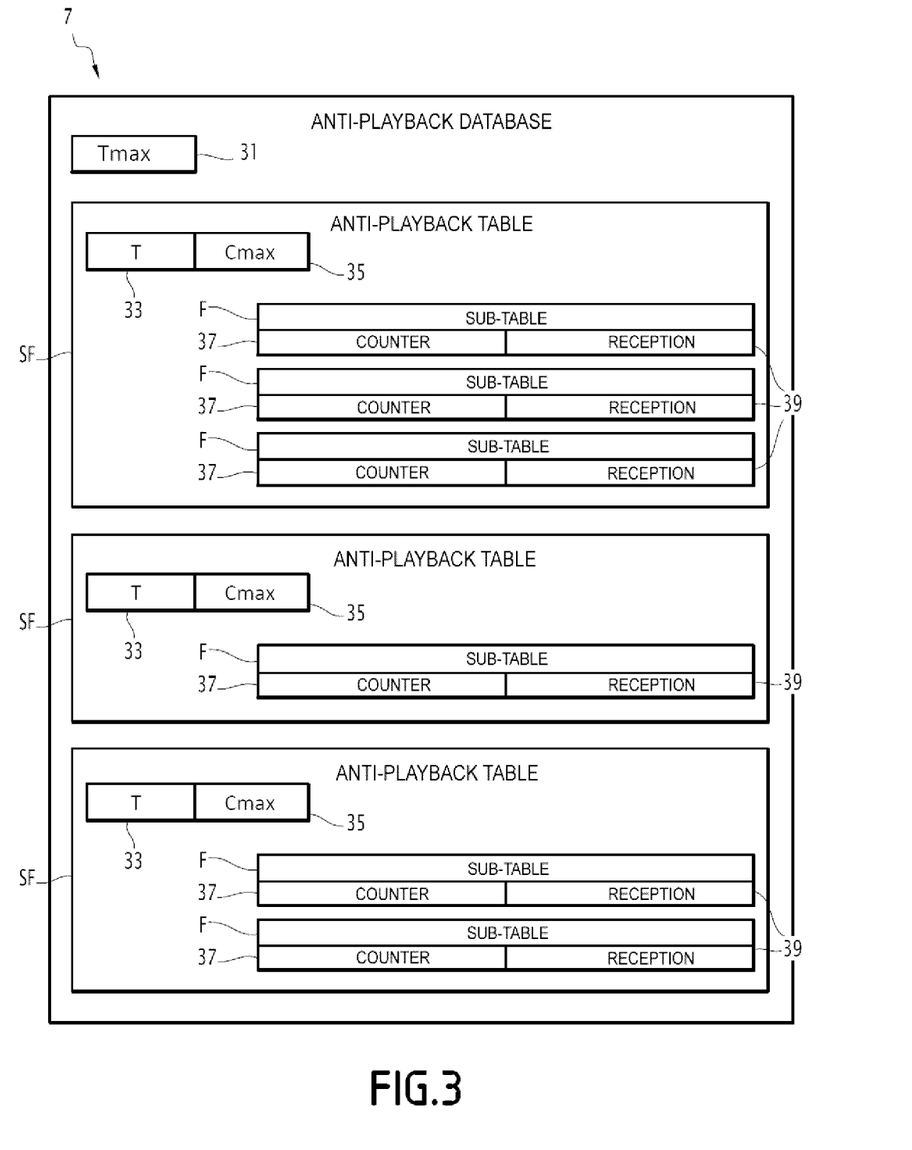
FIG. 3 is a diagrammatic view showing a database of the receiving station shown in FIG. 1.

The receiving station R includes an anti-playback database 7 dedicated to protecting against the playback of the data traffic transmitted by the transmitting station, and shown in FIG. 3.

According to one particular embodiment, the receiving station R has access, through any means known by those skilled in the art, to the database 7, which is, for example, physically included in the receiving station R. The receiving station R advantageously hosts a control software application suitable for allowing the receiving station R to implement an algorithm 9 shown in FIG. 4.

The operation of the installation 1 will now be described.

Figure 1:
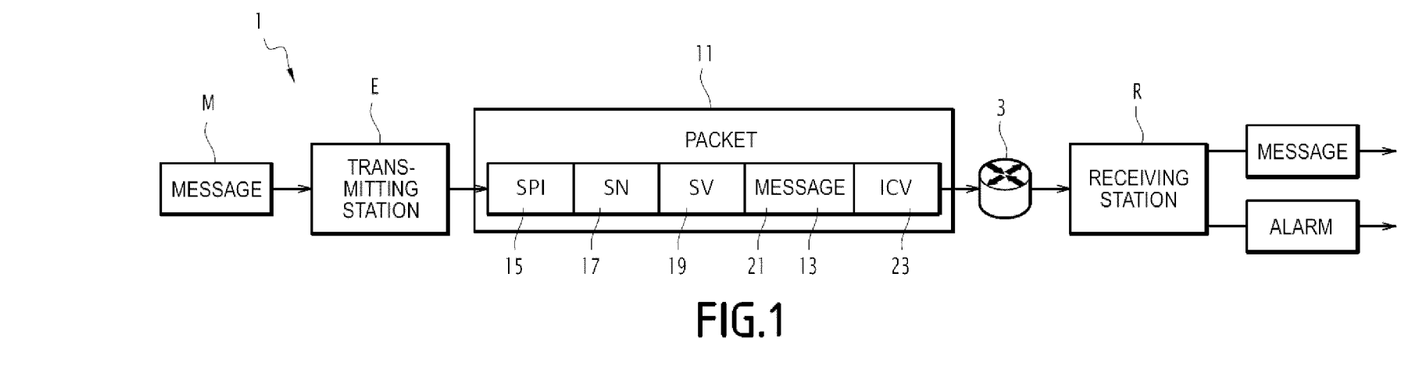
FIG. 1 is a diagrammatic view of an installation implementing a method according to an embodiment.

As shown in FIG. 1, the transmitting station E encapsulates the message M in a packet 11.

The packets 11 are successively sent via the network 3 over several consecutive time periods, advantageously with equal lengths. For example, the time periods last 10 minutes.

During each time period, N packets 11 are for example sent over the network 3, N being a natural number, preferably a power of two.

Each packet 11 advantageously includes a field 15 containing a Security Parameter Index (SPI) index. The SPI index allows the unique identification of a cryptographic context used by the transmitting station E to ensure the confidentiality and/or integrity protection of the sequence number (SN) fields 17 and 21 containing the message. The cryptographic context to which the SPI index refers, for example, includes a secret key K shared in advance between the transmitting station E and the receiving station R.

Each packet 11 also includes a field 17 containing a Sequence Number (SN) identifier. The SN identifier makes it possible to protect the packet 11 against playback. The method guarantees the uniqueness of the value of the SN identifier for each packet 11.

Each packet 11 optionally includes a field 19 containing an initialization vector SV.

Each packet 11 also includes a field 21 containing the message M. The field 21 containing the message can be confidentiality protected. The encryption of the field 21 containing the message uses the value of the SV field 19 and a shared secret key K identified by the SPI index.

Each packet 11 lastly includes a field 23 containing an integrity check value (ICV). The ICV field 23 makes it possible to protect the integrity of the SN field 17 and the field 21 containing the message. The calculation of the ICV field 23 uses the value of the SV field 19 and a shared secret key K identified by the SPI index.

The fields 15, 17, 19 and 23 advantageously have a fixed size, i.e., the same size for all of the packets.

The field 15 for example extends over 32 bits.
The field 17 for example extends over 32 bits.
The field 19 for example extends over 128 bits.
The field 21 has a variable size.
The field 23 for example extends over 32, 64, 80 or 128 bits.

The SV field 19 is optional. The uniqueness of the SN identifier being guaranteed by the method, according to one alternative, the SN identifier is used as initialization vector.

The initialization vector SV is unique for a given key K. A good quality random number generator is for example used to generate the value of the initialization vector SV and guarantee its uniqueness.

The uniqueness of the SN identifier being guaranteed by the method, according to one alternative, the SN identifier is used as the initialization vector.

The SN identifier includes a time indicator T representative of the time period during which the packet 11 was transmitted, and a counting indicator C representative of the transmission order of the packet within the time period during which the packet was transmitted.

The value of the SN identifier is obtained using the module 5 for generating sequence numbers (FIG. 2), the operating principle of which is described below.

The field 17 containing the SN identifier is filled in by the module 5, which generates:

a source identifier ID that for example occupies an upper part 25 of the field 17,
the time indicator T, which for example occupies an intermediate part 27 of the field 17, and
the counting indicator C, for example occupying a lower part 29 of the field 17.

The upper part 25, the intermediate part 27 and the lower part 29 advantageously have a fixed size.

Advantageously, the source identifier uniquely identifies the transmitting station E from among other transmitting stations (not shown).

The time indicator T is representative of the time period during which the packet 11 is transmitted. It is not necessary to transmit a complete time reference of the transmitting station E. Several bits are sufficient for the receiving station R to deduce the complete time reference of the transmitting station E if necessary. All of the packets 11 transmitted in the same time period taken from among all of the consecutive time periods mentioned above have the same time indicator T. The time indicator T is thus representative of the time period.

More generally, in this application, it is understood that a parameter is representative of a notion if a match table exists between that parameter and that notion.

The counter providing the counting indicator C is for example initialized when the secret key K is changed and each time the time indicator T is changed. The counter providing the counting indicator C is next incremented upon each transmission of a packet 11.

The database 7 is configured to store the SN identifiers that have already been received. As will be seen below, the storage of the SN identifiers that have already been received is either explicit or implicit.

"Explicit" means that the information according to which the SN identifier has been received is stored in the database 7, for example owing to one bit per received identifier.

"Implicit" means that the information according to which the SN identifier has been received is deduced from information stored in the database 7. This information is obtained at the end of one or more logic tests pertaining to fields of the database 7. For example, implicit storage is done by storing the fact that identifier ranges have already been received. Implicit storage is for example done from indicators Tmax and Cmax and the absence of a table SF or a sub-table SF in the database 7.

The database 7 includes a field 31 containing a maximum time indicator Tmax, and one or more anti-playback tables SF.

The maximum time indicator Tmax is representative of the maximum of the time indicators T of the packets 11 already received.

Each table SF is suitable for storing SN identifiers of the packets 11 transmitted during one of the time periods. Each table SF is respectively dedicated to one of the time periods during which the packets 11 are sent by the transmitting station.

Each table SF includes a field 33 containing the time indicator T to which it is dedicated, and one or more sub-tables F suitable for storing counting indicators C.

Each table SF also includes a field 35 containing a maximum counting indicator Cmax.

Within the database 7, the tables SF are separated two by two. There are no two separate tables SF having the same time indicator T in the field 33. Thus, a table SF is uniquely identified within the database 7 by its field 33.

The maximum counting indicator Cmax of the tables SF is representative of the existing, or previously existing, sub-table F in which the highest counting indicator C already received for a packet 11 transmitted during the time period of which the time indicator T of the table SF is representative is or was stored.

Each sub-table F includes a field 37 containing an identifier of the sub-table, and a field 39 suitable for storing the counting indicators C of the SN identifiers already received. Each sub-table F is respectively dedicated to an interval (i.e., a range) of counting indicators C. The interval advantageously has a fixed length. For example, a sub-table F stores 64 consecutive values of counting indicators C.

In each table SF, the sub-tables F are separated two by two. There are no two sub-tables F having the same identifier in their respective fields 37. Thus, each sub-table F of a table SF is uniquely identified within the table SF by its field 37.

The maximum counting indicator Cmax contained in the field 35 of each table SF is for example equal to the maximum value contained in the fields 37 of the sub-table F that the table SF contains or contained.

The field 39 is advantageously suitable for containing a counting indicator C belonging to an interval corresponding to N packets successively transmitted over the same time period. For example, this involves a field of N bits, with N advantageously equal to 64 or 4096.

For example, a bit 0 in the field 39 means that the counting indicator C whose value corresponds to the location of that bit has not been received. Conversely, a bit at 1 in the field 39 means that the counting indicator C whose value corresponds to the location of that bit has indeed been received.

Within a sub-table F, the first bit of the field 39 corresponds to a counting indicator C with a value equal to the value of the field 37.

All of the fields of the database 7 advantageously have a fixed size, including those of the tables SF and the sub-tables F.

The operation of the installation 1, i.e., a method according to certain embodiments, will now be described.

The transmitting station E (FIG. 1) creates, then sends the packets 11 via the network 3. The packets 11 are uniquely identified by the SN identifier representative of a transmission order. However, due to the internal operation of the network 3, the packets 11 reach the receiving station R in an order different from the transmission order. Furthermore, there is a risk of one or more packets 11 being intercepted and played back by an attacker with physical access to the network 3.

Figure 4:
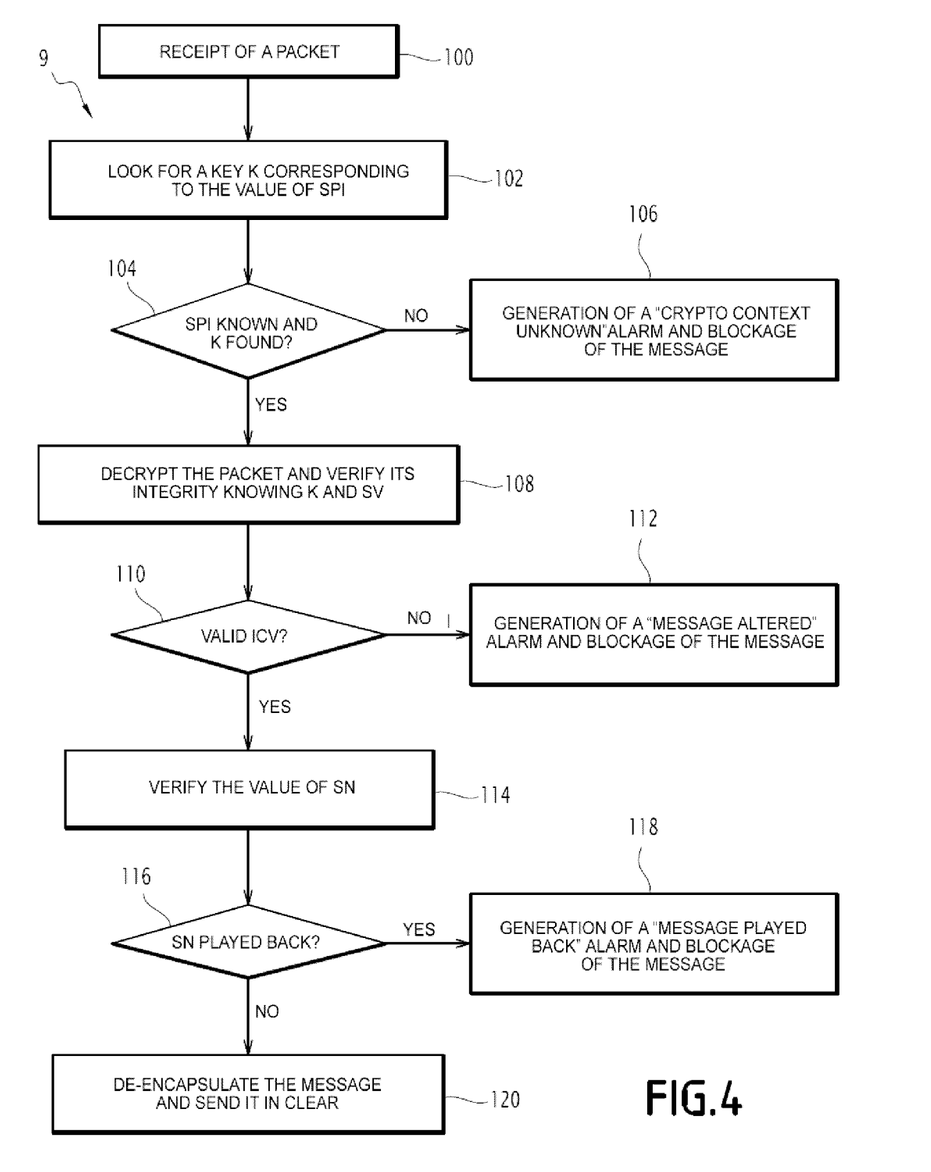
FIG. 4 is a diagrammatic view showing an algorithm of the steps of the method according to an embodiment implemented by the receiving station shown in FIG. 1.

The receiving station R implements the algorithm 9 diagrammed in FIG. 4.

The algorithm 9 first includes a step 100 for receiving a packet 11.

In a step 102, the receiving station R reads the received packet 11. The receiving station R obtains the SPI index contained in the field 15 (FIG. 1).

The receiving station R next performs a test 104 for recognizing the SPI index and looking for the secret key K.

If the SPI index is not recognized and/or no secret key K is found, the receiving station R goes on to a step 106 including generating an alarm to indicate that the cryptographic context is unknown. Furthermore, the receiving station R blocks the packet 11 and the message M that it contains.

If the SPI index is recognized and a corresponding secret key K is found, the receiving station R goes on to a step 108 advantageously including decryption and integrity verification of the packet 11.

For the integrity verification, the receiving station R calculates an integrity check value from fields of the packet whose integrity has been protected by the transmitting station, the secret key K and the initialization vector SV contained in the fields 19 of the packet. If the calculated integrity check value is not equal to the integrity check value ICV contained in the field 23 of the packet 11, then the receiving station R goes on to a step 112 for generating an alarm to indicate that the packet 11 has been altered and blocks the packet and the message M that it contains.

If the calculated integrity check value is equal to the integrity check value ICV, the receiving station R carries out a step 114 for verifying the received SN identifier.

If the step 114 shows that the received SN identifier is considered to have been played back, then the receiving station R goes on to step 118 for generating an alarm to indicate that the packet of the packet 11 has been played back and blocks the message M.

If step 114 shows that the received SN identifier is considered not to have been played back, then the receiving station R goes on to a step 120 for extracting the message M from the packet 11, and transmitting the packet.

The verification step 114 comprises a sub-step (not shown) for consulting the database 7 of previously received identifiers to determine whether the received identifier (SN) has already been received, and a sub-step (not shown) for updating the database 7.

Optionally, if the time indicator T of the received SN identifier indicates that the packet 11 was transmitted for a duration exceeding a threshold, then the packet 11 is rejected without consulting the database 7. The threshold is defined based on the lifetime of the messages M. For example, the threshold is equal to two hours.

In the consultation sub-step, the packet 11 is considered already to have been received if the time indicator T of the received SN identifier is less than or equal to the maximum time indicator Tmax and if, in the database 7, no specific table SF for the time period of which the indicator T is representative exists. In that case, the received SN identifier is implicitly contained in the database 7. Despite the absence of a table SF that may explicitly contain the received SN identifier, the received SN identifier is considered already to have been received. The reason for such an absence will be provided below.

The packet 11 is also considered already to have been received if:
the time indicator T of the received SN identifier is less than or equal to the maximum time indicator Tmax,
in the database 7, a specific table SF exists for the time period of which the time indicator T is representative, and
in said table SF, a sub-table F exists that has already stored a counting indicator C.

In that case, the received SN identifier is already explicitly contained in the database 7.

The packet 11 is also considered already to have been received if:
- in the database, a specific table SF exists for the time period of which the time indicator T is representative,
- in said table SF, there is no sub-table F containing the counting indicator C, and
- the counting indicator C is within an interval (with a length equal to 64, for example) whereof the lower bound is less than or equal to the maximum counting indicator Cmax of said table SF.

This is a second case of implicit storage of the SN identifier in the database 7. The storage is implicit because, despite the absence of a sub-table F able to contain the received counting indicator C, the received SN identifier is nevertheless considered already to have been received.

In all of the other cases, the received SN identifier is considered not to have been received already, i.e., not to have been replayed.

The sub-step for updating the database 7 depends on the result of the consultation sub-step.

If the received SN identifier is considered already to have been received, there is no particular update of the database 7.

If the received SN identifier is considered to have been received for the first time, it is then stored in the database 7 as follows.

If no table SF exists able to store the received identifier SN, a new table SF able to store the received SN identifier is created in the database 7. Furthermore, the maximum time indicator Tmax is updated to assume the value of the time indicator T. If necessary, new tables SF are created in the database 7 to cover the time periods situated between the time period corresponding to the old value of the maximum time indicator Tmax (before it was updated) and the time period corresponding to the new value of the maximum time indicator Tmax (after it has been updated).

The counting indicator C of the received SN identifier is stored in the sub-table F dedicated to the value range in which the counting indicator C is found. If no sub-table F exists able to store the counting indicator C, a new sub-table F able to store the counting indicator C is created in the database 7. If the counting indicator C is greater than the maximum counting indicator Cmax, then the maximum counting indicator Cmax is increased to assume the value of the field 37 of the sub-table created to store the counting indicator C.

If applicable, new sub-tables SF are created in the database 7 to cover the counting indicator C ranges situated between the range corresponding to the old value of the maximum counting indicator Cmax (before it was updated) and the range corresponding to the new value of the maximum counting indicator Cmax (after it has been updated). The receiving station R also carries out a database management step (not shown) including conditional erasure of any one of the sub-tables F if the sub-table F is full.

"Full" means that all of the packets that are on the one hand transmitted during the time period of the table SF containing said sub-table F, and on the other hand that have a counting indicator C included in the successive range of said sub-table F, have been received. For example, all of the bits of the field 39 of the full sub-table F are equal to "1".

Advantageously, the management step also includes conditional erasure of any one of the tables SF if all of the packets transmitted during the time period of said table have been received.

Advantageously, the management step also includes conditional erasure of any one of the tables SF if the time indicator T (field 33) of the table SF indicates that the table SF is too old, i.e., has a duration above a certain threshold that has elapsed since the time period of which the time indicator T of the table SF is representative.

Optionally, in order to free up memory space, when the memory space allocated to the storage of the database 7 is saturated:
- if the database 7 includes several tables SF, then the oldest table SF (having the oldest value of the time indicator T) is deleted from the database 7,
- otherwise, the oldest sub-table F (having the lowest identifier in the field 37) is deleted.

Lastly, to reduce its minimum memory space occupied by the database 7, the latter is compressed.

The contents of the database 7, in particular the reception indicator for the field 39 of the sub-tables F, has a majority of bits at 1 (received packets) and a random distribution of bits at 0 (not received or lost packets), corresponding to the packet loss rate by the network 3, which is for example approximately 20% of the transmitted packets.

Optionally, a lossless data compression algorithm is implemented, for example Huffman encoding. The algorithm preserves the data structure of the database 7. Only the contents of the tables SF are compressed. For each table SF, all of the tables F are concatenated and compressed in a single data block.

This allows direct access to each table SF from the database 7 in its compressed form.

A software instruction program is advantageously stored in the receiving station R. When the receiving station R executes the program, it carries out steps 100 to 120 described above, as well as a step for managing the database.

The program is for example executed within a microprocessor architecture of the receiving station R comprising:
- one or more microprocessor cores, for example CPU ARM CORTEX A15,
- a random-access memory, for example DDR SDRAM,
- a high-capacity non-volatile memory, for example a Flash memory,
- a backed up volatile memory, for example NVRAM, and
- one or more input/output ports, allowing the reception and transmission of data packets protected against playback.

The database 7 is advantageously completely archived in its compressed form in the Flash memory. The use of an operating system including a file system makes it possible to facilitate and optimize the use of the Flash memory.

The modified elements of the database 7, not yet archived and compressed in the Flash memory, are advantageously backed up in the non-volatile NVRAM memory.

The current state of the database 7 is then obtained by a combination of the content of the Flash memory (compressed complete archive) and the NVRAM memory (elements that have been modified relative to the content of the compressed archive).

In the event of a sudden power loss in all or part of the receiving station R, the state of the database 7 is preserved. The next time it is started up, a simple process for reconstructing the state of the database, combining the information archived in the Flash memory and backed up in the NVRAM memory, allows the receiving station R to return to operational status quickly.

When the NVRAM memory is full, or periodically, for example every two minutes, the database 7 that is archived and compressed in the Flash memory is updated and the NVRAM memory is emptied.

This makes it possible to extend the lifetime of the non-volatile Flash memory through a reduced number of write cycles, and to optimize the use of the low capacity of the NVRAM memory.

Owing to the features described above, the size of the database 7 is reduced. This reduces the latency introduced by the playback protection mechanism, the risk of false detection of packet playback, and the risk of non-detection of packet playback.

The proposed solution also does not deteriorate the performance of the network 3.

The method according to certain embodiments is suitable for being effectively combined with protection of the IPSEC authentication header (AH) and encapsulating security payload (ESP) type, owing to the pooling of the protocol and cryptographic encapsulation mechanisms.

The method is compatible with different distribution methods: point-to-point, and point-to-multipoint.

The method is applicable to communication protocols other than IP, for example OSI level 2 communication protocols, for instance Ethernet, or higher levels.

The method according to certain embodiments makes it possible to manipulate small anti-playback sub-tables F, typically 64 bits, while keeping the trace of many received packets. This size is compatible with all current microprocessor architectures, and makes it possible to optimize access to and manipulation of the sub-tables F. The method also makes it possible to manipulate larger anti-playback sub-tables, typically 4096 bits, in order to take advantage of modern processor architecture cache mechanisms and the considerable size of memory blocks of the NOR/NAND Flash type.

The physical implementation of the method is suitable for the performance of technologies currently used in infrastructure-type security equipment, in particular in terms of memory capacity (SDRAM, backed up SRAM, NVRAM and Flash) and the aging of that memory (Flash NOR and NAND in particular).

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of detecting whether a packet from a plurality of packets transmitted by at least one transmitting station over a network has been played back, each packet comprising a message and a packet identifier, the packets being successively transmitted over several consecutive time periods, the method including the following steps:

receiving the packet by at least one receiving station and reading the identifier of the received packet to obtain a received identifier;

consulting, by the receiving station, a database of identifiers already received to determine whether the received identifier has already been received; and if the received identifier has not already been received, updating the database to include the received identifier, wherein:

the identifier includes an indicator of belonging to groups of packets, the database includes one or more sub-tables configured to store the identifiers of packets already having been received, each sub-table respectively being dedicated to one of the groups, the method further includes managing the database including conditional erasure of any one of the sub-tables if all of the packets of the group to which that sub-table is dedicated have been received, the belonging indicator includes a counting indicator representative of a transmission order of said packet, the sub-table(s) is or are further configured to store counting indicators respectively belonging to one or more successive intervals of counting indicators, each sub-table respectively being dedicated to one of said successive intervals, and the managing the database includes conditional erasure of any one of the sub-tables if the sub-table is full.

2. The method according to claim 1, wherein:

the belonging indicator further includes a time indicator representative of the time period during which the packet was transmitted, the counting indicator being representative of a transmission order of said packet within the time period during which the packet was transmitted, the database includes one or more tables, each table respectively being configured to store identifiers of packets transmitted during one of the time periods, each table respectively being dedicated to one of the time periods, and each table includes one or more sub-tables.

3. The method according to claim 2, wherein the step for managing the database includes conditional erasure of any one of the tables if all of the packets transmitted during the time period of that table have been received.

4. The method according to claim 2, wherein the step for managing the database includes conditional erasure of any one of the tables if the time elapsed between the time period specific to that table and a current time indicator is above a given value.

5. The method according to claim 2, wherein the database includes a maximum time indicator representative of the maximum of the time indicators of the packets already received, wherein each table includes a maximum counting indicator representative of the highest counting indicator interval of all of the identifiers already having been stored in said table, and wherein, the consulting further includes determining that the packet has already been received if the time indicator is below or equal to the maximum time indicator and if:
- in the database, no specific table exists for the time period of which the time indicator is representative, or
- in the database, a specific table for the time period of which the time identifier is representative exists, and in said table, there is a sub-table that has already stored the counting indicator, or
- in the database, there is a specific table for the time period of which the time indicator is representative, and in said table, there is no sub-table containing the counting indicator, and the counting indicator is less than or equal to the maximum counting indicator of said table.

6. The method according to claim 2, further including verifying the integrity of at least the received identifier and generating an alarm if the received identifier does not demonstrate integrity.

7. The method according to claim 6, wherein each packet includes a security parameter representative of a secret key shared between the transmitter and the receiving station, the secret key being used in the verifying the integrity.

8. The method according to claim 2, wherein the receiving station is configured to receive packets coming from several transmitting stations and consult several databases of previously received identifiers, the received identifier including an indicator representative of the transmitting station that transmitted the received packet, the database consulted in the consulting being chosen based on the indicator of the received identifier.

9. The method according to claim 2, wherein, in the database, for each table the sub-tables of the table are concatenated and compressed in a single data block.

10. The method according to claim 2, wherein the receiving station implements:
- a Flash memory in which the database is archived completely,
- a volatile random access memory comprising at least a partial copy of the database, and
- a non-volatile memory, comprising parts of the database updated during the update step and not yet archived in the Flash memory.

11. The method according to claim 10, wherein the non-volatile memory is in the form of a non-volatile random-access memory (NVRAM).

12. The method according to claim 10, wherein the data base is completely archived in the Flash memory in a compressed state.

13. A non-transient computer readable storage medium to be installed in a receiving station and storing instructions for implementing a method of detecting whether a packet from a plurality of packets transmitted by at least one transmitting station over a network has been played back when the instructions are executed by the receiving station, each packet comprising a message and a packet identifier, the packets being successively transmitted over several consecutive time periods, the method comprising:
- receiving the packet by at least one receiving station and reading the identifier of the received packet to obtain a received identifier;
- consulting, by the receiving station, a database of identifiers already received to determine whether the received identifier has already been received; and
- if the received identifier has not already been received, updating the database to include the received identifier, wherein:
- the identifier includes an indicator of belonging to groups of packets,
- the database includes one or more sub-tables configured to store the identifiers of packets already having been received, each sub-table respectively being dedicated to one of the groups,
- the method further includes managing the database including conditional erasure of any one of the sub-tables if all of the packets of the group to which that sub-table is dedicated have been received,
- the belonging indicator includes a counting indicator representative of a transmission order of said packet,
- the sub-table(s) is or are further configured to store counting indicators respectively belonging to one or more successive intervals of counting indicators, each sub-table respectively being dedicated to one of said successive intervals, and
- the managing the database includes conditional erasure of any one of the sub-tables if the sub-table is full.

* * * * *